United States Patent
Nonaka et al.

(10) Patent No.: US 8,048,293 B2
(45) Date of Patent: Nov. 1, 2011

(54) DESULFURIZATION CATALYST FOR CATALYTIC CRACKED GASOLINE AND METHOD FOR DESULFURIZING CATALYTIC CRACKED GASOLINE USING THE SAME

(75) Inventors: Seijiro Nonaka, Kitakyushu (JP); Hiroshi Matsumoto, Kitakyushu (JP); Yoshiaki Kato, Kitakyushu (JP); Kazuo Shirozono, Kitakyushu (JP)

(73) Assignee: JGC Catalysts and Chemicals Ltd., Kawasaki-Shi, Kanagawa (JP)

( * ) Notice: Subject to any disclaimer, the term of this patent is extended or adjusted under 35 U.S.C. 154(b) by 841 days.

(21) Appl. No.: 11/602,296

(22) Filed: Nov. 21, 2006

(65) Prior Publication Data
US 2007/0119750 A1 May 31, 2007

(30) Foreign Application Priority Data

Nov. 29, 2005 (JP) ................................. 2005-344070

(51) Int. Cl.
*C10G 29/16* (2006.01)
*C10G 11/04* (2006.01)
*C10G 11/18* (2006.01)
*B01J 23/22* (2006.01)

(52) U.S. Cl. ...................... 208/249; 208/120.2; 502/353

(58) Field of Classification Search .................... 208/46, 208/106, 113, 118, 119, 120.2, 121, 177, 208/208 R, 249; 502/60, 64, 77, 78, 79, 502/100, 300, 353
See application file for complete search history.

(56) References Cited

U.S. PATENT DOCUMENTS

| | | | | |
|---|---|---|---|---|
| 2,831,652 A | * | 4/1958 | Gemperle et al. | 502/9 |
| 2,911,359 A | * | 11/1959 | Hansford | 502/247 |
| 2,945,824 A | * | 7/1960 | Fleck | 502/216 |
| 4,111,845 A | * | 9/1978 | McKay | 208/113 |
| 6,852,214 B1 | * | 2/2005 | Chester et al. | 208/113 |

FOREIGN PATENT DOCUMENTS

JP 2003-27065 1/2003

OTHER PUBLICATIONS

"Colloid" in Random House Unabridged Dictionary (1997) available at http://dictionary.infoplease.com/colloid.*
"Colloid" in Britannica Online Encyclopedia (2010) available at http://www.britannica.com/EBchecked/topic/125898/colloid.*

* cited by examiner

*Primary Examiner* — Glenn Caldarola
*Assistant Examiner* — Randy Boyer
(74) *Attorney, Agent, or Firm* — Manabu Kanesaka

(57) ABSTRACT

The desulfurization catalyst for catalytic cracked gasoline according to the present invention has high performance in removal of sulfur compounds in gasoline fractions. This catalyst contains particulate vanadium oxide having the average particle diameter in the range from 0.1 to 10 μm at the content in the range from 0.3 to 3 weight % calculated as that of $V_2O_5$. The porous spherical particles of inorganic oxide are made of crystalline aluminosilicate zeolite and a porous inorganic oxide matrix, and furthermore contain antimony.

7 Claims, No Drawings

DESULFURIZATION CATALYST FOR CATALYTIC CRACKED GASOLINE AND METHOD FOR DESULFURIZING CATALYTIC CRACKED GASOLINE USING THE SAME

FIELD OF THE INVENTION

The present invention relates to desulfurization catalyst for catalytic cracked gasoline and a method of desulfurizing catalytic cracked gasoline using the desulfurization catalyst. More specifically, the present invention relates to desulfurization catalyst for catalytic cracked gasoline for removing a sulfur content contained in catalytic cracked gasoline obtained by catalytically cracking heavy hydrocarbon oil and vacuum gas oil with a fluidized catalytic cracking unit (sometimes abbreviated as a FCC unit hereinafter).

BACKGROUND OF THE INVENTION

The FCC gasoline obtained by means of the fluidized catalytic cracking of heavy hydrocarbon oil or vacuum gas oil contains sulfur compounds. Recently, in view of the environmental concerns such as prevention of air pollution or the like, it is required that a sulfur content in the FCC gasoline should be reduced because catalyst for removing NOx contained in exhaust gas from vehicles rapidly decreases its activity due to the effect by the sulfur content. An amount of sulfur contained in gasoline is regulated to be less than 50 ppm at the end of 2004 in Japan, and there have been proposed various methods for desulfurization of FCC gasoline in the FCC unit.

For instance, Japanese Patent No. 3545652 discloses a method for reducing sulfur contents in catalytic cracked oil fractions. This method includes a step of catalytic cracking feed oil fractions containing organic sulfur compounds in the presence of catalyst for reduction of sulfur contents at a high temperature and under the fluidized catalytic cracking conditions to produce a liquid product with the sulfur content substantially reduced. The commercially available catalyst for reduction of a sulfur content is porous molecular sieve, contains oxidized vanadium metal in an oxidized state of more-than-zero in inner pores of the molecular sieve crystalline structure, and the vanadium metal is present as a cation species produced by ion exchange in the pores of the sieve crystalline structure.

However, because the commercially available catalyst for reduction of sulfur contents contains oxidized vanadium metal in an oxidized state of more-than-zero in inner pores of the molecular sieve structure and the vanadium structure is present as a cation species produced by ion exchange in the pores of the sieve structure, the vanadium metal breaks a crystalline structure of the molecular sieve to disadvantageously lower the capability for catalytic cracking oil feed fractions.

Japanese Patent Laid-Open No. 2003-27065 discloses a desulfurization method for catalytic cracked gasoline with catalyst for desulfurization by means of catalytic cracking, and in this method, feed oil is catalytically cracked in a fluidized catalytic cracking unit or a heavy oil fluidized catalytic cracking unit with catalyst homogeneously carrying at least one type of metal selected from a group consisting of vanadium, zinc, nickel, iron, and cobalt on an inorganic porous carrier. This patent document also describes that it is preferable to use vanadium or zinc from the view point of desulfurization of the produced gasoline fractions.

However, the catalyst homogeneously carrying vanadium on the inorganic porous carrier has low affinity with sulfur compounds, so that the activity for desulfurization is low, and the improvement has been desired. Furthermore, if the inorganic porous carrier is fluidized catalytic cracking catalyst (sometimes referred to as FCC catalyst hereinafter) containing Y-zeolite, the catalyst has the effect of removing a sulfur content in gasoline fractions when heavy hydrocarbon oil is catalytically cracked, but because the Y-zeolite is destroyed by vanadium, the cracking activity drops, so that mounts of generated hydrogen and coke disadvantageously increase.

SUMMARY OF THE INVENTION

For solving the problems described above, an object of the present invention is to provide desulfurization catalyst for catalytic cracked gasoline having the high desulfurization capability and cracking activity in removing a sulfur content in gasoline fractions and also capable of suppressing generation of hydrogen and coke when heavy hydrocarbon oil or vacuum gas oil is catalytically cracked.

Another object of the present invention is to provide a desulfurization method in catalytic cracked gasoline with the desulfurization catalyst.

To achieve the object described above, the inventors made strenuous and serious efforts to find that desulfurization catalyst for catalytic cracked gasoline containing particulate vanadium oxide has excellent capability for catalytic cracking heavy hydrocarbon oil or vacuum gas oil, and also that generation of hydrogen and coke is suppressed even though the cracking activity of the catalyst is high. The present invention was made based on this finding.

In other words, a desulfurization catalyst for catalytic cracked gasoline according to the present invention comprises porous spherical particles of an inorganic oxide containing particulate vanadium oxide.

In the particulate vanadium oxide, preferably the average diameter is in a range from 0.1 to 10 μm.

A content of the particulate vanadium oxide as calculated as that of $V_2O_5$ is preferably in a range from 0.3 to 3 weight %.

The porous spherical particles of inorganic oxide preferably contain antimony.

The porous spherical particles of inorganic oxide preferably contain crystalline aluminosilicate zeolite and porous matrix of inorganic oxide.

In the desulfurization method for catalytic cracked gasoline according to the present invention, a desulfurization reaction and a catalytic cracking reaction are carried out simultaneously by contacting heavy hydrocarbon oil and/or vacuum gas oil under the fluidized catalytic cracking to mixed catalysts in which the desulfurization catalyst for catalytic cracked gasoline and the catalyst for catalytic cracking hydrocarbon are mixed at a mixing ratio in a range from 5/95 to 50/50.

The desulfurization catalyst for catalytic cracked gasoline according to the present invention has high activity for desulfurization because vanadium oxide is present in particulate state in the porous spherical particles of inorganic oxide and affinity of the vanadium oxide to organic sulfur compounds is high.

When the FCC catalyst containing crystalline aluminosilicate zeolite is used as the porous spherical particles of inorganic oxide, because the vanadium oxide is present in the particulate state, the vanadium oxide is distributed little in the catalyst particles during use of the catalyst in the FCC unit, and the crystalline aluminosilicate zeolite is not destroyed by the vanadium oxide, so that the cracking activity is high and generation of hydrogen and coke is suppressed.

Furthermore, in the desulfurization catalyst for catalytic cracked gasoline containing antimony in addition to vanadium oxide according to the present invention, the antimony has high capability of hydrogenating sulfur compounds, and also provides the effect of suppressing generation of hydrogen by suppressing the dehydrogenating reaction.

DETAILED DESCRIPTION OF THE EMBODIMENTS

Desulfurization Catalyst for FCC Gasoline

The desulfurization catalyst for FCC gasoline according to the present invention contains particulate vanadium oxide in porous spherical particles of inorganic oxide material.

The vanadium oxide which may be used in the present invention includes, but not limited to $V_2O_5$, $V_2O_3$, $VO_2$, and VO, and especially $V_2O_5$ (vanadium pentoxide) is preferable because the desulfurization activity is high.

An average particle diameter of the particulate vanadium oxide is preferably in a range from 0.1 to 10 µm. When the average particle diameter of the particulate vanadium oxide is smaller than 0.1 µm, the state is close to that in which vanadium oxide is homogeneously carried, and sometimes the high desulfurization activity can not be obtained. Furthermore, the desulfurization catalyst for FCC gasoline is used together with the FCC catalyst in the FCC unit at a temperature in the range from 400 to 800° C., and therefore the vanadium oxide contained in the desulfurization catalyst for FCC gasoline sometimes melts and migrates into pores of the zeolite, which may in turn cause breakage of the zeolite crystal.

When the average particle diameter of the particulate vanadium oxide is more than 10 µm, sometimes abrasion resistance of the desulfurization catalyst for gasoline may be degraded.

More preferably the average particle diameter of the particulate vanadium oxide is in the range from 0.5 to 7 µm, and further preferably in the range from 1 to 5 µm.

The average particle diameter of the particulate vanadium oxide in the desulfurization catalyst for gasoline according to the present invention is obtained by measuring maximum diameters of 100 or more vanadium oxide particles sampled from at least 5 sections in a reflection electronic image taken by a scanning electron microscope (SEM). It is to be noted that, because an average particle diameter of vanadium oxide used as the particulate vanadium oxide or of particulate vanadium compounds such as ammonium metavanadate which changes to vanadium oxide at a use temperature of the desulfurization catalyst for gasoline is identical to an average particle diameter of the particular vanadium oxide in the desulfurization catalyst for gasoline, the average particle diameter of the particulate vanadium oxide in the desulfurization catalyst for gasoline may be expressed with the average diameter of the used particulate vanadium compound.

The size of porous spherical particles of inorganic oxide is the same as that of the FCC catalyst generally used in the FCC unit for heavy hydrocarbon oil or vacuum gas oil, and more specifically an average particle diameter of the spherical particles is preferably in the range from 40 to 90 µm.

The conventional desulfurization catalyst for FCC gasoline has low affinity with sulfur compounds and the desulfurization activity is rather low, because vanadium oxide is homogeneously distributed in the porous spherical particles of inorganic oxide.

In contrast, in the desulfurization catalyst for FCC gasoline according to the present invention, because vanadium oxide is contained in the particulate state in the porous spherical particles of inorganic oxide, the affinity of vanadium oxide to organic sulfur compounds is high, and desulfurization is performed selectively.

When the porous spherical particles of inorganic oxide is FCC catalyst containing crystalline aluminosilicate zeolite described below, the cracking activity is high because the crystalline aluminosilicate zeolite is not destroyed by vanadium oxide, and generation of hydrogen and coke is suppressed.

In the desulfurization catalyst for FCC gasoline according to the present invention, preferably a content of the particulate vanadium oxide calculated as that of $V_2O_5$ is in the range from 0.3 to 3 weight %. When the contents is less than 0.3 weight %, the desulfurization performance for removing a sulfur content in the gasoline fractions may drop in cracking heavy hydrocarbon oil or vacuum gas oil. On the contrary, when the content is higher than 3 weight %, the desulfurization performance for removing a sulfur content becomes higher, but amounts of generated hydrogen and coke increase, and a yield of gasoline fractions generally drops. More preferably the content of vanadium oxide calculated as that of $V_2O_5$ is in the ranger from 0.5 to 2 weight %.

The desulfurization catalyst for FCC gasoline according to the present invention preferably contains antimony in addition to the vanadium oxide in the porous spherical particles of inorganic oxide. When the desulfurization catalyst includes antimony in addition to vanadium oxide, the effect of suppressing generation of hydrogen and coke increases in fluidized catalytic cracking heavy hydrocarbon oil or vacuum gas oil with the yield of the gasoline fractions improved. It is guessed that generation of hydrogen is suppressed because a portion of antimony and vanadium form compounds such as $SbVO_4$, $Sb_2VO_5$, $Sb_{0.9}V_{0.1}O_4$ to suppress dehydrogenation reaction by vanadium.

A content of antimony calculated as that of $Sb_2O_3$ in the catalyst is in the range from 0.3 to 5 weight %, and more preferably in the range from 0.5 to 4 weight %.

Furthermore, the desulfurization catalyst for FCC gasoline according to the present invention may contain, in addition the vanadium oxide as described above, a metal such as zinc, nickel, iron, and cobalt which are typically used as desulfurization catalyst for FCC gasoline.

In the desulfurization catalyst for FCC gasoline according to the present invention, spherical particles of an inorganic oxide generally used in fluidized catalytic cracking catalyst may be used.

The porous inorganic oxide, which can be used in the present invention, includes crystalline aluminosilicate zeolite such as Y-zeolite, ultra stable Y-zeolite (USY), X-zeolite, mordenite, beta-zeolite and ZSM zeolite; heat-resistant metal oxides such as silica, alumina, silica-alumina, silica-magnesia, alumina-boria, titania, zirconia, silica-zirconia, calcium silicate, calcium aluminate; and clay minerals such as kaolin, bentonite, and halloysite.

The desulfurization catalyst for FCC gasoline according to the present invention is preferably made of crystallite aluminosilicate zeolite such as Y-zeolite, ultra stable Y-zeolite and ZSM-5, and an inorganic oxide matrix. Preferably the inorganic oxide matrix includes heat-resistant metal oxide functioning as a binder for silica, alumina, and silica-alumina, and clay mineral such as kaolin, and further includes, if necessary, an appropriate amount of porous silica xerogel and alumina powder or a metal-trap agent.

A content of the crystalline aluminosilicate zeolite is preferably in the range from 5 to 50 weight % in the catalyst. The crystalline aluminosilicate zeolite is ion-exchanged with at least one kind of cation selected from the group consisting of hydrogen, ammonium, and polyvalent metals like in the ordinary catalytic cracking catalyst.

Especially, it is advantageous in the present invention to employ the desulfurization catalyst for FCC gasoline comprising porous spherical particles of inorganic oxide prepared by mixing the particulate vanadium oxide in the FCC catalyst containing the ordinary crystalline aluminosilicate zeolite used in an FCC unit for heavy hydrocarbon oil or vacuum gas oil.

The desulfurization catalyst according to the present invention is produced by the method of producing the ordinary FCC catalyst. For instance, such a material as the particulate vanadium oxide with the average particle diameter in the range from 0.1 to 10 μm or particulate ammonium metavanadate which can be converted to vanadium oxide by sintering, the ultra stable Y-zeolite, and an inorganic oxide matrix precursor containing silica sol, kaolin, silicate hydroxide dust and alumina hydrate are mixed with each other, the mixture is spray-dried, and the obtained spherical particles are washed, dried, and sintered at a temperature in the range from about 500 to 700° C. Sintering can be performed in a regenerator column of an FCC unit under the conditions for regenerating catalyst. An average particle diameter of the spherical particles is preferably in the range from 40 to 90 μm.

When the desulfurization catalyst for FCC gasoline contains antimony in addition to the particulate vanadium oxides, for instance, the desulfurization catalyst for FCC gasoline described above is mixed into a hydrochloric solution with antimony chloride being dissolved therein, neutralized with sodium hydroxide, dehydrated, washed, dried and sintered if needed, so that the desulfurization catalyst for FCC gasoline is produced.

Method of Desulfurizing FCC Gasoline

In the desulfurization method for FCC gasoline according to the present invention, the desulfurization is performed simultaneously with a catalytic cracking by contacting heavy hydrocarbon oil and/or vacuum gas oil with the mixed catalyst of the desulfurization catalyst for FCC gasoline described above and the FCC catalyst under the fluidized catalytic cracking conditions.

As the FCC catalyst, the commercially available FCC catalyst may be used, and especially the FCC catalyst containing faujasite zeolite is preferably used because of the high cracking activity. The FCC catalyst containing faujasite zeolite is, for instance, a catalyst containing faujasite zeolite (USY) with the $SiO_2/Al_2O_3$ molar ratio of 5 to 6, in the range from 10 to 50 weight %; silica as a binder in the range from 15 to 20 weight %; active alumina in the range from 0 to 20 weight %; a metal trap agent in the range from 0 to 10 weight %; and kaolin in the range from 25 to 65 weight %.

As the FCC catalyst as described above, ACZ, DCT, STW, BLC, HMR (which are trademarks or registered trademarks of FCC catalysts produced by Catalysts & Chemicals Industries Co. Ltd) and the like are exemplified. As the FCC catalyst according to the present invention, equilibrium catalyst of the FCC catalyst used for catalytic cracking hydrocarbon oil in the FCC unit may be employed.

In the mixed catalyst described above, the mixing ratio of the desulfurization catalyst for FCC gasoline and the FCC catalyst is in the range from 5/95 to 50/50 by weight. When the mixing ratio of the desulfurization catalyst for FCC gasoline is less than 5/95 by weight, sulfur compounds in the gasoline fraction can not sufficiently be removed because a quantity of the desulfurization catalyst is not enough. When the mixing ratio of the desulfurization catalyst for FCC gasoline is more than 50/50 by weight, the catalytic cracking activity and the yield of gasoline become lower.

The mixing ratio of the desulfurization catalyst and the FCC catalyst is preferably in the range from 10/90 to 30/70 by weight.

In the method of desulfurization for FCC gasoline according to the present invention, desulfurization and catalytic cracking are performed simultaneously by contacting heavy hydrocarbon oil and/or vacuum gas oil to the mixed catalyst described above under the fluidized catalytic cracking conditions in an FCC unit. The catalytic conditions include commonly used in this industry may be employed, and include, for instance, a catalytic cracking temperature in the range from 400 to 600 degrees Celsius, and a regeneration temperature in the range from 500 to 800 degrees Celsius.

EXAMPLES

The present invention is described below further specifically below with reference to the examples, but the present invention is not limited to the examples in any way.

Example of Production 1

Suspension α of Particulate Ammonium Metavanadate 857 grams of pure water was added to 643 grams of ammonium metavanadate (produced by Kashimakita Electric Power Corp.) to obtain a suspension of $V_2O_5$ with the concentration of 30 weight %. The obtained suspension was sufficiently agitated and pulverized for 1 hour with the Attriter pulverizer to prepare a suspension α of particulate ammonium metavanadate.

An average particle diameter of ammonium metavanadate in the suspension α was measured with a particle size analyzer (produced by Horiba Seisakusho Corp., CAPP-700) to find that the average particle diameter was 2.1 μm.

Example of Production 2

Suspension β of Particulate Ammonium Metavanadate 857 grams of pure water was added to 643 grams of ammonium metavanadate (produced by Kashimakita Electric Power Corp.) to obtain a suspension of $V_2O_5$ with the concentration of 30 weight %. The obtained suspension was sufficiently agitated and pulverized for 10 hours with the Attriter pulverizer to prepare a suspension β of particulate ammonium metavanadate.

An average particle diameter of ammonium metavanadate in the suspension β was measured with a particle size analyzer (produced by Horiba Seisakusho Corp., CAPP-700) to find that the average particle diameter was 1.2 μm.

Example of Production 3

Suspension γ of Particulate Ammonium Metavanadate 857 grams of pure water was added to 643 grams of ammonium metavanadate (produced by Kashimakita Electric Power Corp.) to obtain a suspension of $V_2O_5$ with the concentration of 30 weight %. The obtained suspension was sufficiently agitated and pulverized for 30 minutes with the Attriter pulverizer to prepare a suspension γ of particulate ammonium metavanadate.

An average particle diameter of ammonium metavanadate in the suspension γ was measured with a particle size analyzer (produced by Horiba Seisakusho Corp., CAPP-700) to find that the average particle diameter was 4.1 μm.

Example of Production 4

Suspension δ of Particulate Ammonium Metavanadate 857 grams of pure water was added to 643 grams of ammonium metavanadate (produced by Kashimakita Electric Power Corp.) to obtain a suspension of $V_2O_5$ with the concentration of 30 weight %. The obtained suspension was sufficiently agitated to prepare a suspension δ of particulate ammonium metavanadate.

An average particle diameter of ammonium metavanadate in the suspension δ was measured with a particle size analyzer (produced by Horiba Seisakusho Corp., CAPP-700) to find that the average particle diameter was 6.5 μm.

Example of Production 5

FCC Catalyst (a)

1125 grams of kaolin, 125 grams of active alumina, and 875 grams of ultra stable Y-zeolite slurry were added to 1609 grams of basic aluminum chloride with the $Al_2O_3$ concentration of 23.3 weight % (aluminum chlorohydrol, referred to as AHC hereinafter) to prepare a mixed slurry. This mixed slurry was spray-dried to prepare a spherical particles, and the spherical particles were washed until a content of $Na_2O$ is 0.5 weight % or below, and then was dried in a drier at a temperature of 135 degrees Celsius to prepare FCC catalyst (a).

The FCC catalyst (a) was made of $Al_2O_3$ by 15 weight % from the AHC solution, kaolin by 45 weight %, active alumina by 5 weight %, and ultra stable Y-zeolite by 35 weight %.

Characteristics of the FCC catalyst (a) are as shown in Table 1.

Example 1

Desulfurization Catalyst A for FCC Gasoline

To adjust a concentration of $Al_2O_3$ in the catalyst to 15 weight %, the suspension α prepared in Example of Production 1, kaolin, active alumina, and ultra stable Y-zeolite slurry were added to 1609 grams of the AHC solution with the $Al_2O_3$ concentration of 23.3 weight % by 25 grams, 1100 grams, 125 grams, and 875 grams respectively so that the concentrations in the solution were 1 weight %, 44 weight %, 5 weight %, and 35 weight % respectively, to prepare a mixed slurry. This mixed slurry was spay-dried to prepare spherical particles, which were washed until a content of $Na_2O$ dropped to 0.5 weight % or below and dried in a drier at a temperature of 135 degrees Celsius to prepare desulfurization catalyst A for FCC gasoline.

A sample was prepared by sintering a portion of the desulfurization catalyst A for FCC gasoline for 2 hours at a temperature of 600 degrees Celsius, and an average particle diameter was measured by measuring maximum diameters of 100 vanadium oxide particles from the sample with a scanning electron microscope (SEM) to find that the average diameter was 2.1 μm.

Characteristics of the desulfurization catalyst A for FCC gasoline are as shown in Table 1.

Example 2

Desulfurization Catalyst B for FCC Gasoline

To adjust a concentration of $Al_2O_3$ in the catalyst to 15 weight %, the suspension β prepared in Example of Production 2, kaolin, active alumina, and ultra stable Y-zeolite slurry were added to 1609 grams of the AHC solution with the $Al_2O_3$ concentration of 23.3 weight % by 25 grams, 1100 grams, 125 grams, and 875 grams respectively so that the concentrations in the solution were 1 weight %, 44 weight %, 5 weight %, and 35 weight % respectively, to prepare a mixed slurry. This mixed slurry was spay-dried to prepare spherical particles, which were washed until a content of $Na_2O$ dropped to 0.5 weight % or below and dried in a drier at a temperature of 135 degrees Celsius to prepare desulfurization catalyst B for FCC gasoline.

Characteristics of the desulfurization catalyst B for FCC gasoline are as shown in Table 1.

Example 3

Desulfurization Catalyst C for FCC Gasoline

To adjust a concentration of $Al_2O_3$ in the catalyst to 15 weight %, the suspension γ prepared in Example of Production 3, kaolin, active alumina, and ultra stable Y-zeolite slurry were added to 1609 grams of the AHC solution with the $Al_2O_3$ concentration of 23.3 weight % by 25 grams, 1100 grams, 125 grams, and 875 grams respectively so that the concentrations in the solution were 1 weight %, 44 weight %, 5 weight %, and 35 weight % respectively, to prepare a mixed slurry. This mixed slurry was spay-dried to prepare spherical particles, which were washed until a content of $Na_2O$ dropped to 0.5 weight % or below and dried in a drier at a temperature of 135 degrees Celsius to prepare desulfurization catalyst C for FCC gasoline.

Characteristics of the desulfurization catalyst C for FCC gasoline are as shown in Table 1.

Example 4

Desulfurization Catalyst D for FCC gasoline

To adjust a concentration of $Al_2O_3$ in the catalyst to 15 weight %, the suspension δ prepared in Example of Production 4, kaolin, active alumina, and ultra stable Y-zeolite slurry were added to 1609 grams of the AHC solution with the $Al_2O_3$ concentration of 23.3 weight % by 25 grams, 1100 grams, 125 grams, and 875 grams respectively so that the concentrations in the solution were 1 weight %, 44 weight %, 5 weight %, and 35 weight % respectively, to prepare a mixed slurry. This mixed slurry was spay-dried to prepare spherical particles, which were washed until a content of $Na_2O$ dropped to 0.5 weight % or below and dried in a drier at a temperature of 135 degrees Celsius to prepare desulfurization catalyst D for FCC gasoline.

Characteristics of the desulfurization catalyst D for FCC gasoline are as shown in Table 1.

Example 5

Desulfurization Catalyst E for FCC Gasoline

To adjust a concentration of $Al_2O_3$ in the catalyst to 15 weight %, the suspension α prepared in Example of Production 1, $Sb_2O_5$ sol (produced by Hakuto Corp.), kaolin, active alumina, and ultra stable Y-zeolite slurry were added to 1609 grams of the AHC solution with the $Al_2O_3$ concentration of 23.3 weight % by 25 grams, 25 grams, 1075 grams, 125 grams, and 875 grams respectively so that the concentrations in the solution were 1 weight %, 1 weight %, 43 weight %, 5 weight %, and 35 weight % respectively, to prepare a mixed slurry. This mixed slurry was spay-dried to prepare spherical particles, which were washed until a content of $Na_2O$ dropped to 0.5 weight % or below and dried in a drier at a temperature of 135 degrees Celsius to prepare desulfurization catalyst E for FCC gasoline.

Characteristics of the desulfurization catalyst E for FCC gasoline are as shown in Table 1.

Comparative Example 1

Desulfurization Catalyst (b) for FCC Gasoline 6.4 grams of ammonium metavanadate was dissolved in 165.0 grams of an aqueous solution of amine. Then the solution was impregnated in 495.0 grams (dry base) of the FCC catalyst (a) prepared in Example 3 of Production, and the catalyst was dried for 12 hours at a temperature of 135 degrees Celsius. Then the catalyst was sintered for 2 hours at a temperature of 600 degrees Celsius to prepare desulfurization catalyst (b) for FCC gasoline with vanadium pentoxide carried thereon.

Based on a result of line analysis with an electron probe microanalyzer (WDS), it was confirmed that the vanadium pentoxide was homogeneously carried even inside the desulfurization catalyst (b) for FCC gasoline.

Characteristics of the desulfurization catalyst (b) for FCC gasoline are as shown in Table 1.

Each of the catalysts was sintered for 13 hours in the steam atmosphere prior to the actual reaction to subject to the catalyst to steaming. The catalyst having been subjected to steaming was mixed in 2 kilograms of FCC equilibrium catalyst at the ratio of 10 weight %, and the mixture was injected into the reactor to catalytically crack feed oil.

The reaction conditions are as follows.

| Feed oil: | desulfurized vacuum gas oil |
|---|---|
| Reaction temperature: | 500 degrees Celsius |
| Catalyst/feed oil ratio: | 7 g/g |
| Feed oil supplying speed: | 10 g/min |
| CRC (Carbon concentration on regenerated catalyst): | 0.05 weight % |

Analysis of produced gases and product oils were performed by gas chromatography, and the product oil obtained

TABLE 1

Characteristics of Catalysts A to E, a, and b

| | | Ex. 1 A | Ex. 2 B | Ex. 3 C | Ex. 4 D | Ex. 5 E | Pro. 5 a | Com. 1 b |
|---|---|---|---|---|---|---|---|---|
| Loss of ignition (1000° C., 1 hr) | wt % | 18.3 | 18.5 | 18.0 | 18.1 | 18.8 | 18.0 | 4.5 |
| Residual $Na_2O$ | wt % | 0.4 | 0.4 | 0.4 | 0.4 | 0.4 | 0.4 | 0.4 |
| Residual $SO_4$ | wt % | 2.1 | 2.1 | 2.1 | 2.1 | 2.1 | 2.1 | 2.1 |
| $Al_2O_3$ | wt % | 47.7 | 47.5 | 47.3 | 47.5 | 47.2 | 48.1 | 47.5 |
| $V_2O_5$ | wt % | 1.16 | 0.98 | 1.04 | 1.12 | 1.08 | — | 0.98 |
| Av. particle diameter of $V_2O_5$ | μm | 2.1 | 1.2 | 4.1 | 6.5 | 2.1 | — | — |
| $Sb_2O_3$ | wt % | — | — | — | — | 1.21 | — | — |
| Balk specific gravity | g/ml | 0.68 | 0.68 | 0.68 | 0.67 | 0.69 | 0.68 | 0.68 |
| Specific surface area | $m^2/g$ | 250 | 252 | 250 | 244 | 248 | 255 | 250 |
| Abrasion resistance | wt %/h | 0.1 | 0.1 | 0.2 | 0.4 | 0.1 | 0.1 | 0.1 |

Example 6

Activities of the catalysts A to E prepared in Examples 1 to 5 and the catalyst (b) prepared in Comparative Example 1 were accessed with a pilot plant. This pilot plant is based on a recycling fluidized bed system in which reactions with catalyst and regeneration of the catalyst are performed alternately by recycling the catalyst within the reactor like in the FCC unit for hydrocarbon oil actually used in the industry.

in a range from $C_5$ to the boiling point of 204 degrees Celsius was taken as the gasoline fraction.

The obtained product oil was fractionated to gasoline and cycle oils by the distillation equipment (theoretical plate number: 45 plates, by Touka Seiki Corp.), and a concentration of sulfur in the gasoline was analyzed by coulometric titration method (ASTM D-3120).

A yield of each product when the catalyst/feed oil ratio is 7 g/g and a concentration of sulfur in gasoline are shown in Table 2.

TABLE 2

Activity Assessment of Catalysts A to E, and b

| | | Eq.cat | A | B | C | D | E | b |
|---|---|---|---|---|---|---|---|---|
| Conversion ratio | wt % | 74.3 | 73.5 | 74.2 | 74.0 | 73.8 | 74.3 | 72.7 |
| Hydrogen | wt % | 0.13 | 0.19 | 0.15 | 0.15 | 0.15 | 0.11 | 0.23 |
| C1 + C2 + C2= *5) | wt % | 1.5 | 1.6 | 1.5 | 1.5 | 1.5 | 1.5 | 1.6 |
| LPG *1) | wt % | 14.5 | 13.8 | 13.9 | 14.0 | 13.9 | 14.0 | 15.4 |
| Gasoline *2) | wt % | 54.8 | 54.2 | 55.1 | 54.8 | 54.7 | 55.2 | 50.1 |
| LCO *3) | wt % | 18.4 | 18.8 | 18.5 | 18.6 | 18.7 | 18.4 | 18.3 |
| HCO *4) | wt % | 7.3 | 7.7 | 7.3 | 7.4 | 7.5 | 7.3 | 8.8 |
| Coke | wt % | 3.3 | 3.7 | 3.5 | 3.5 | 3.5 | 3.4 | 5.5 |
| Octane value in gasoline | | 92.1 | 92.0 | 91.9 | 91.8 | 92.0 | 92.0 | 92.1 |
| S-concentration in gasoline | wt-ppm | 20 | 13 | 12 | 12 | 13 | 11 | 16 |

(Note for Table 2)
*1) LPG (Liquified petroleum gas) includes propane, propylene, n-butane, i-butane, and butylenes.
*2) Gasoline is a product fractionated in a range from $C_5$ to the boiling point of 204° C.
*3) LCO (light cycle oil) is a product fractionated in a range from the boiling point of 204° C. to 343° C.
*4) HCO (heavy cycle oil) is a product fractionated in a range over the boiling point of 343° C.
*5) C1: methane, C2: ethane, C2=: ethylene

The invention claimed is:

1. A desulfurization catalyst for catalytic cracked gasoline comprising porous spherical particles of inorganic oxide, and vanadium oxide particles present in the porous spherical particles,
    wherein an average particle diameter of the spherical particles is in a range from 40 to 90 μm, and an average particle diameter of the vanadium oxide particles is in a range from 1 to 10 μm, and
    a content of the vanadium oxide particle as calculated as that of $V_2O_5$ is in a range from 0.5 to 2 weight %.

2. The desulfurization catalyst for catalytic cracked gasoline according to claim 1, wherein the porous spherical particles of inorganic oxide contain antimony.

3. The desulfurization catalyst for catalytic cracked gasoline according to claim 1, wherein the porous spherical particles of inorganic oxide are made of a crystalline aluminosilicate zeolite and a porous matrix of inorganic oxide.

4. A method of desulfurizing catalytic cracked gasoline, wherein a catalytic cracking reaction and a desulfurization reaction are simultaneously performed by contacting heavy hydrocarbon oil and/or vacuum gas oil under fluidized catalytic cracking conditions to mixture catalysts prepared by mixing the desulfurization catalyst for catalytic cracked gasoline according to claim 1 and catalyst for catalytic cracked hydrocarbon at a weight ratio in a range from 5/95 to 50/50.

5. The desulfurization catalyst for catalytic cracked gasoline according to claim 1, wherein the average particle diameter of the vanadium oxide particles is 2.1 to 6.5 μm.

6. A desulfurization catalyst for catalytic cracked gasoline comprising porous spherical particles of inorganic oxide, and vanadium oxide particles present in the porous spherical particles,
    wherein an average particle diameter of the spherical particles is in a range from 40 to 90 μm, and an average particle diameter of the vanadium oxide particles is in a range from 1 to 10 μm, and
    the vanadium oxide particles are present in the particulate state without being homogeneously distributed in the porous spherical particles to improve affinity of the vanadium oxide to organic sulfur compounds.

7. The desulfurization catalyst for catalytic cracked gasoline according to claim 6, wherein the porous spherical particles of inorganic oxide comprises 5-50 wt % of a crystalline aluminosilicate zeolite and a porous matrix of inorganic oxide.

* * * * *